(12) United States Patent  (10) Patent No.: US 8,261,441 B1
Carlsten et al.  (45) Date of Patent: Sep. 11, 2012

(54) CABLE JACKET REPAIRING

(75) Inventors: Curtis B. Carlsten, Seekonk, MA (US);
Robert E. Walsh, North Kingston, RI (US)

(73) Assignee: Raytheon Company, Waltham, MA (US)

( * ) Notice: Subject to any disclaimer, the term of this patent is extended or adjusted under 35 U.S.C. 154(b) by 531 days.

(21) Appl. No.: 12/549,916

(22) Filed: Aug. 28, 2009

(51) Int. Cl.
*H01R 43/00* (2006.01)

(52) U.S. Cl. ............... 29/859; 29/825; 29/828; 29/854; 29/855; 385/96; 385/99; 385/100; 385/106; 385/134; 385/135; 385/136

(58) Field of Classification Search ............ 29/825, 29/828, 854, 855, 857, 859; 385/96, 99, 385/100, 101, 106, 134, 135, 136
See application file for complete search history.

(56) References Cited

U.S. PATENT DOCUMENTS

| 5,838,861 | A | * | 11/1998 | Bunde | 385/100 |
| 5,894,536 | A | * | 4/1999 | Rifkin et al. | 385/99 |
| 6,993,237 | B2 | * | 1/2006 | Cooke et al. | 385/135 |
| 7,955,004 | B2 | * | 6/2011 | DiMarco | 385/99 |

OTHER PUBLICATIONS

"Penn-Union Corp. Introduces New Penn-Shrink Heat-Shrink Tubing", Penn-Union Corp., Jun. 12, 2002, 3 pages, http://news.thomasnet.com/fullstory/11130.

* cited by examiner

*Primary Examiner* — Richard Chang
(74) *Attorney, Agent, or Firm* — Daly, Crowley, Mofford & Durkee, LLP

(57) ABSTRACT

In one aspect, a method to repair a cable jacket includes disposing a shrink tube on a damaged area of a cable jacket of a cable. The shrink tube includes a first end portion and a second end portion. The method also includes heating the shrink tube to seal the damaged area and tapering the first end portion of the shrink tube by cutting the shrink tube. Another aspect includes a device to taper end portions of a cable jacket shrink tube repair. A further aspect includes a device to dispose a tube on a cable.

8 Claims, 10 Drawing Sheets

CABLE JACKET REPAIRING

BACKGROUND

Electric, optical or electro-optical cables are typically wrapped in a polymer jacket to protect internal conductors and/or optical fibers from damage. Cable jackets used in undersea applications can be damaged at anytime. In one example, cable jackets may be damaged during assembly. In another example, cable jackets may be damaged during deployment. In a further example, cable jackets may be damaged after deployment by marine life such as marine mammals, sharks, reef fishes, invertebrates and so forth. Also, cable jackets may be damaged during retrieval. Damage to the cable jacket can allow an undersea jacket to become flooded, potentially rendering the cable inoperable.

SUMMARY

In one aspect, a method to repair a cable jacket includes disposing a shrink tube on a damaged area of a cable jacket of a cable. The shrink tube includes a first end portion and a second end portion. The method also includes heating the shrink tube to seal the damaged area and tapering the first end portion of the shrink tube by cutting the shrink tube.

In another aspect, a device to taper end portions of a cable jacket shrink tube repair includes a first member including a first channel extending a long a longitudinal axis of the device, a second member including a second channel extending a long the longitudinal axis of the device and a fastening structure configured to fasten the first member and the second member together and to enable the device to be in an open position and a closed position. In the closed position, the first and second channels are configured to hold a first portion of a cable having a shrink tube and a second portion of the cable without the shrink tube.

In a further aspect, a device to dispose a tube on a cable includes an outer pipe and an inner pipe disposed within the outer pipe. The device is configured to receive a tube between the outer pipe and the inner pipe and to receive the cable through an interior of the inner pipe.

DETAILED DESCRIPTION

Damaged cable jackets are expensive and time-consuming to repair by traditional molding methods. These methods typically require specialized facilities to affect repair. Often reels of damaged cable remain unused on shelves because it is too costly to repair them. For example, high cost (e.g., greater than $100K) subsea cables have been mothballed in significant numbers due to extensive deployment-related jacket damage. Described herein are low cost, fleet adaptable techniques and tools that will save time and money in repairing damaged cable jackets so that these sea cables may be brought into service.

Figure 1:
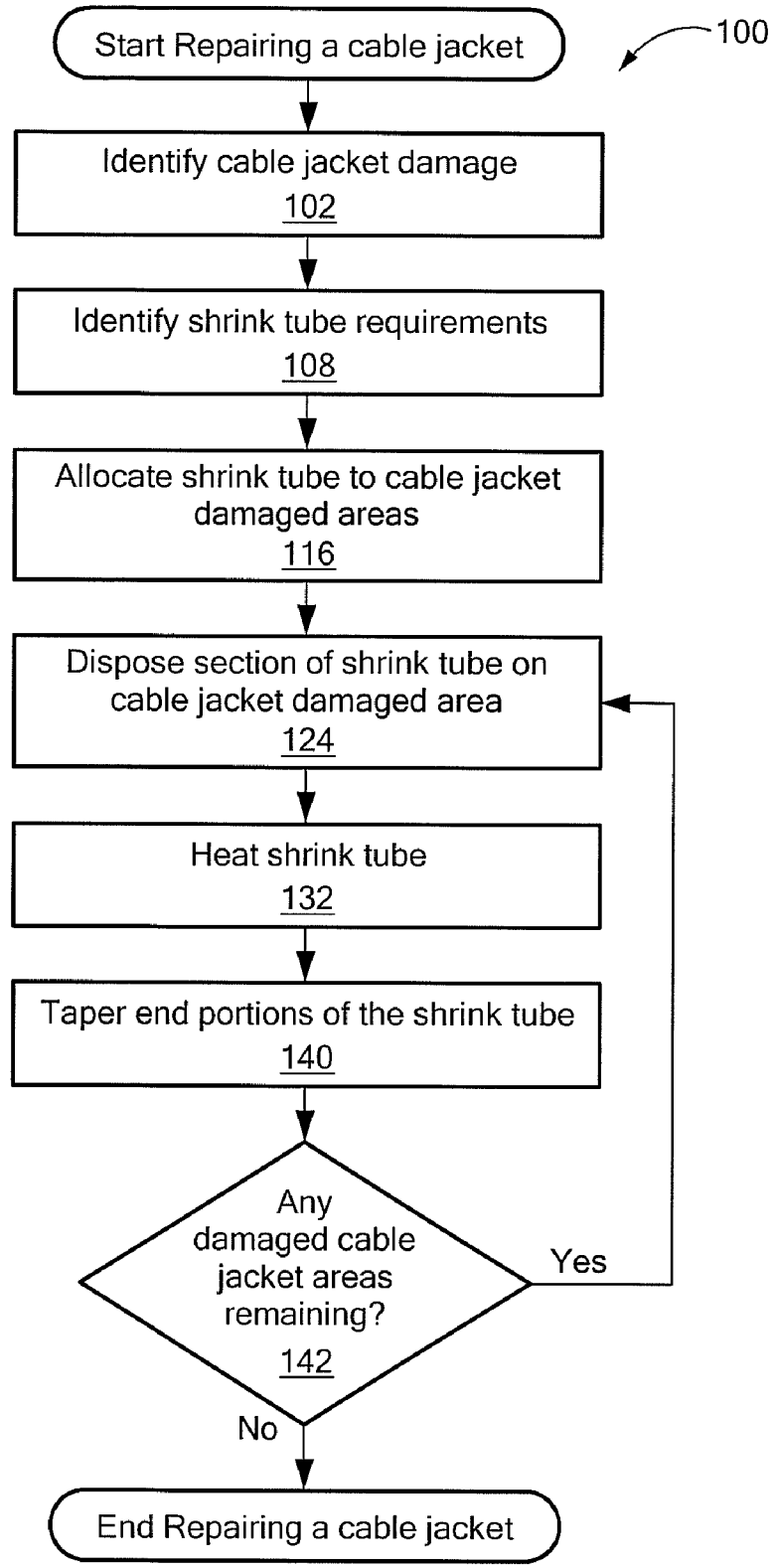
FIG. 1 is a flowchart of an example of a process to repair a cable jacket.

Referring to FIG. 1, an example of a process to repair a cable jacket is a process 100. The process 100 includes repairing cable jacket damage by using heat shrinkable tubing (referred to herein as a "shrink tube") lined with a thermoplastic adhesive to cover the damaged area. In one example, the shrink tube is, prior to heating, a 2-inch nominal inner diameter shrink tube made of polyolefin. In one example, the shrink tube has a shrink/recovery ratio of about eight-to-one. That is, when the shrink tube is heated, its diameter shrinks eight times less than its original size. In one particular example, the shrink tube is a URHT-200 shrink tube manufactured by TYCO ELECTRONICS®/RAYCHEM®. In one example, the shrink tube includes a pre-coated interior lining of thermoplastic adhesive (e.g., a hot melt adhesive). In one particular example, the adhesive is a S1030 hot melt adhesive manufactured by RAYCHEM®. In another example, wraps of S1030 hot melt adhesive tape may be applied to the cable and unlined shrink tube placed over the tape. After applying heat to the adhesive and the shrink tube, the shrink tube originally a nominal 2 inches in inner diameter can be shrunk down to a nominal 0.25-inch inner diameter (or roughly the diameter of a cable) to produce a durable, waterproof sleeving patch capable of withstanding the harsh conditions of a deep sea environment. The eight-to-one shrink ratio is used, in this example, to accommodate connectors and other obstacles on the ends or along the length of the cable, without disassembly or removal of the obstacles. In one example, the URHT-200 shrink tube will pass over a 1.85-inch outside diameter connector at the end of the cable and over numerous 1.25-inch outside diameter in-line obstacles (swellings or bulges containing sensors/hydrophones) along the length of the cable. One of ordinary skill in the art would recognize that other shrink ratios may be considered for dimensionally different cables and cable obstacles.

Cable is inspected and cable jacket damage is identified (102). The amount of shrink tube required for the cable jack repair is determined (108) and allocated (116). For example, for each damaged jacket area identified, an amount of shrink tube is determined and allocated for the cable jacket repair. For each cable jacket damaged area, a section of the shrink tube is disposed onto the cable (124). For example, for each damaged area of the cable jacket an allocated amount of shrink tube is provided. The shrink tube is heated (132). For example, hot air (e.g., from a heat gun, heating blanket or manifold) is applied to the shrink tube. In one example, the temperature of the hot air is about 220° C. The shrink tube reduces in size, melts the adhesive and seals the damaged cable jacket area. The end portions of the shrink tube are tapered (140) to facilitate smooth transition through fairleads and sheaves during cable launch and retrieval. Tapering is necessary due to the exceptionally thick resultant unexpanded/recovered wall dimension initially required to produce an eight-to-1 ratio shrink tube. It is determined if any damaged cable jacket areas remain (142). If so processing blocks 124, 132, 140 and 142 are repeated.

Figure 2A:
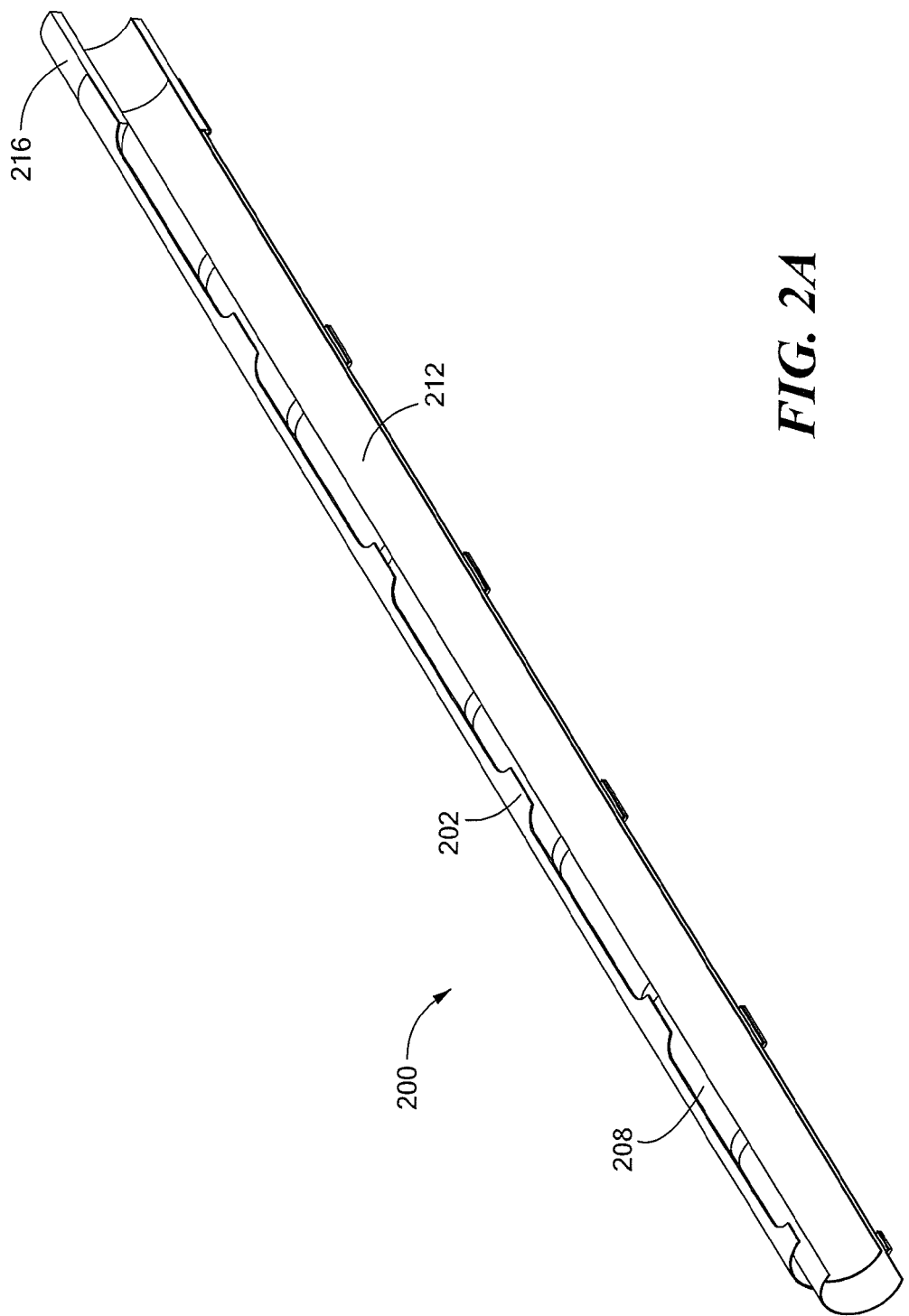
FIG. 2A is cutaway view of an installation tool holding a shrink tube.

Referring to FIG. 2A, an installation tool 200 may be used to dispose shrink tube onto the cable. The installation tool 200 allows for the shrink tube to be deposited onto cable in order to reduce the introduction of any contaminants. In one example, the installation tool 200 includes an outer pipe 202 and an inner pipe 212 which together loosely hold the shrink tube 208 when loaded into the installation tool 200. The outer pipe 202 and the inner pipe 212 are held together by an end cap 216. The outer pipe 202 provides a rigid structure for handling/fixture of the installation tool 200. In one example, the outer pipe 202 has a 2.5 inch inner diameter, a 0.06 inch wall thickness and is about 36 inches long.

Figure 2B:
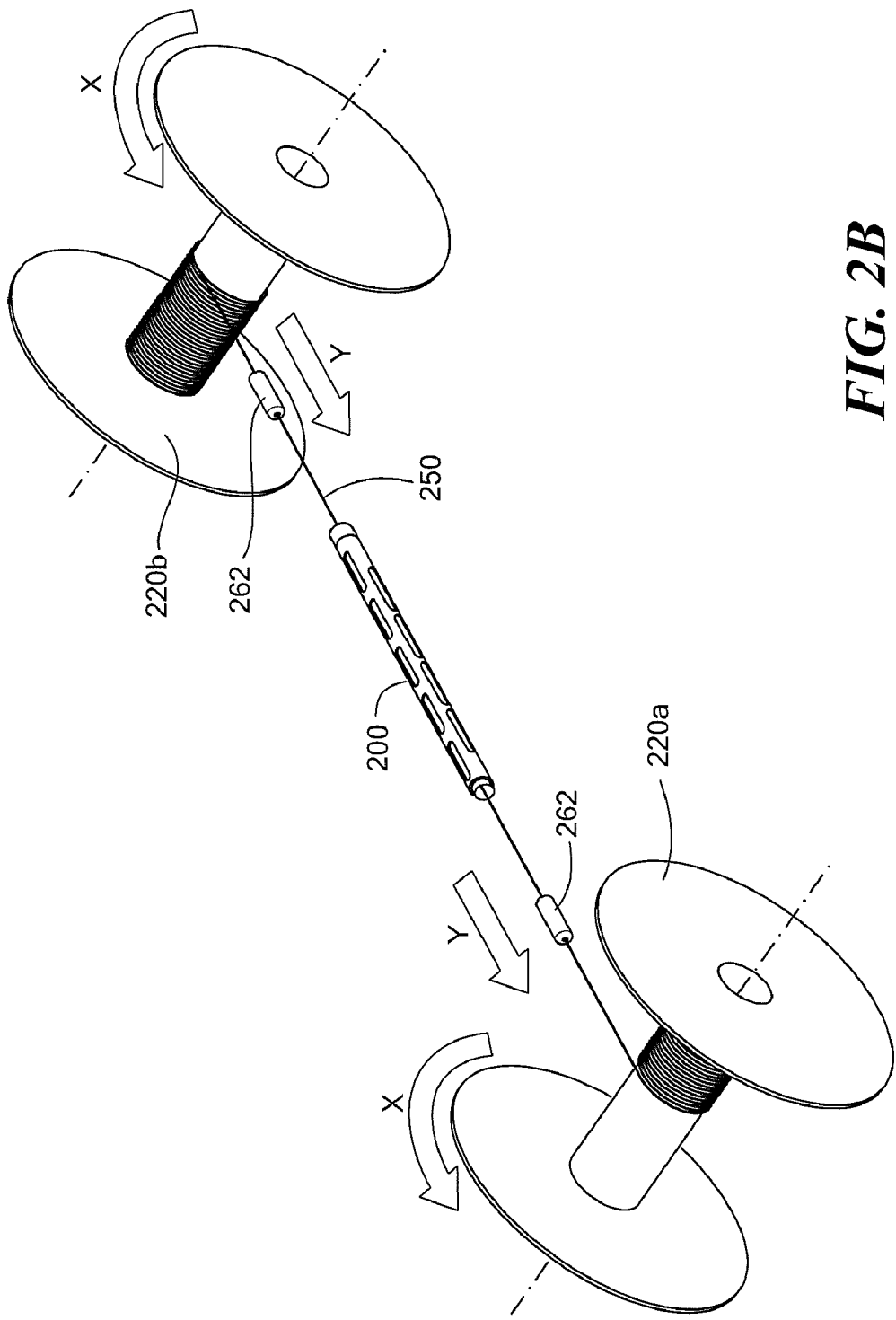
FIG. 2B is a view of the installation tool on a cable on reels.
Figure 2C:
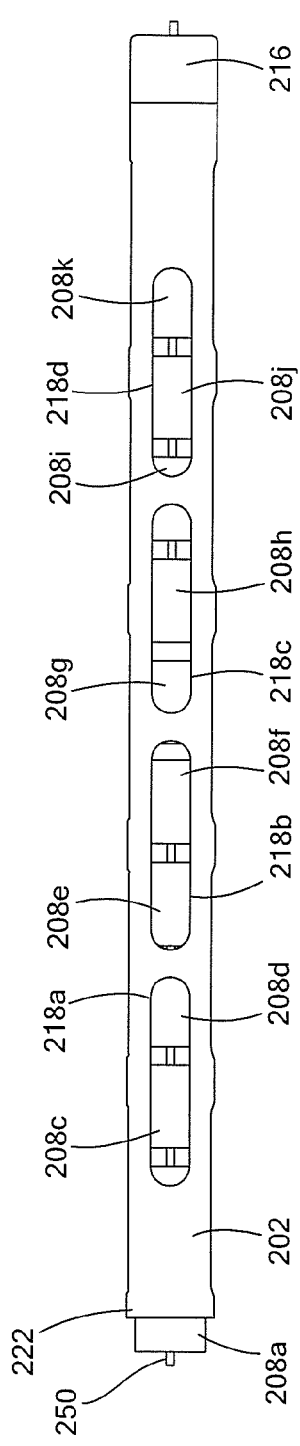
FIG. 2C is a view of the installation tool on the cable.

The outer pipe 202 also includes perforations 218a-218d (FIG. 2C). In one example, the perforations 218a-218d are each about 8 inches long. The inner pipe 212 prevents cable jacket contaminants from contacting an inner surface of the shrink tube 208. In one example, the inner pipe 212 includes a 2-inch outer diameter, a 0.06-inch wall thickness and is about 36 inches long. In one example, the installation tool 200 is about 38 inches long.

Figure 2D:
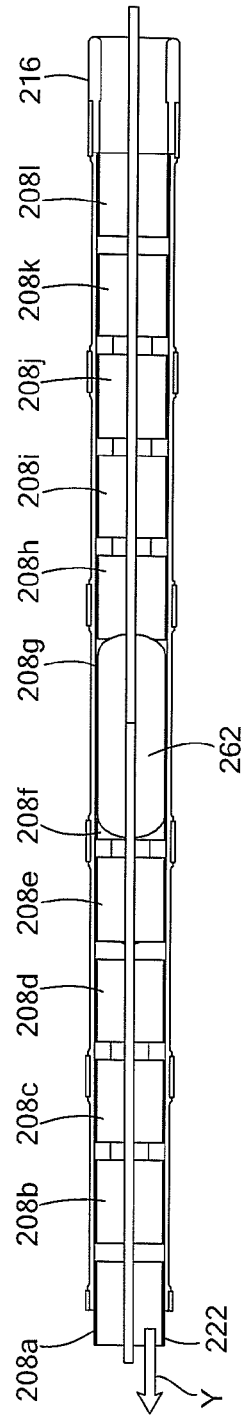
FIG. 2D is a cutaway view of the installation tool of FIG. 2C without an inner pipe.

Referring to FIGS. 2B to 2D, in one example, an end of the cable 250 is passed through the installation tool 100. The cable 250 is rolled from one reel 220b to another reel 220a so that the cable passes through the center of the installation tool 200. For example, the reels 220a, 220b are turned in a rotational direction X and the cable 250 correspondingly moves from the reel 220b to the reel 220a in a direction Y. In some examples, the cable 250 includes inline obstructions 262 represented by swellings or bulges in the cable at connector or sensor locations.

Cable jacket damage is repaired by placing a section of the shrink tube 208 in the installation tool 200 onto to the cable 250 at the damaged area. In one example, the shrink tube 208 is precut into sections 208a-208l prior to being loaded into the installation tool 200. In another example, the shrink tube is cut (e.g., using a sonic cutter or other cutter integrated with the installation tool 200) just prior to the shrink tube sections 208a-208l being removed from the installation tool 200 to be placed over the damaged portion of the cable jacket. The perforations 218a-218d allow the user to slide out shrink tube sections 208a-208l out an end 222 of the installation tool 200.

Figure 3:
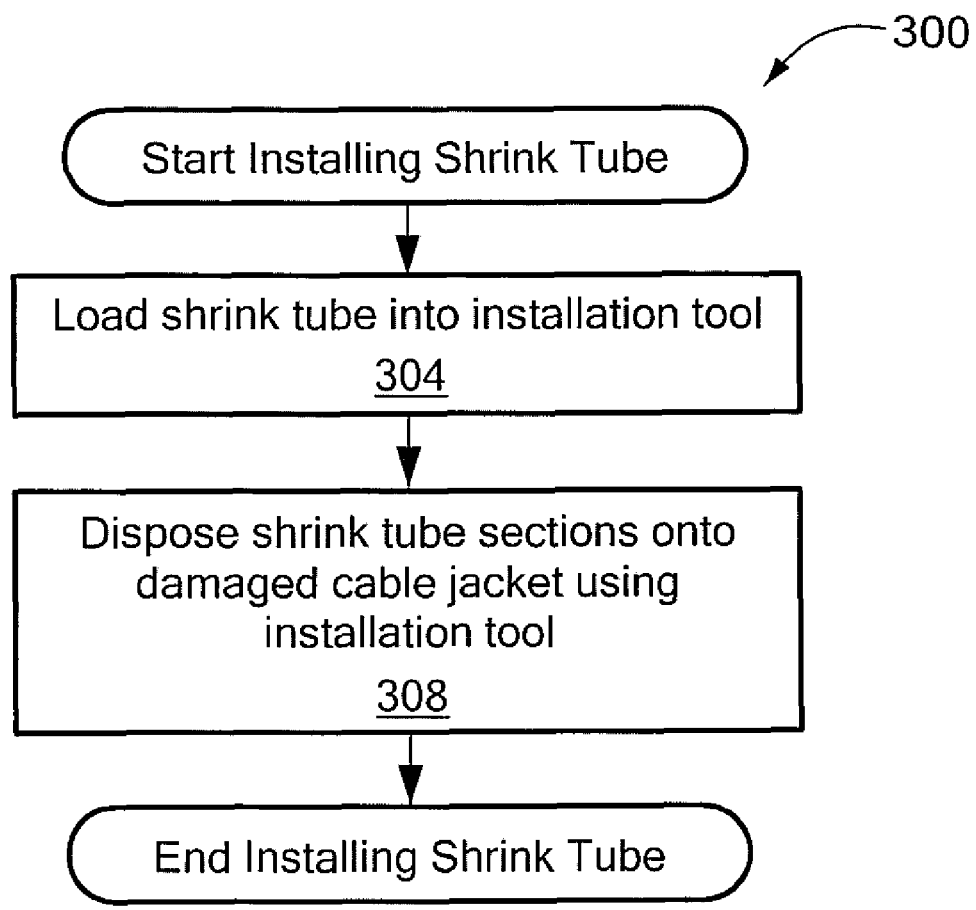
FIG. 3 is a flowchart of an example of a process to install the shrink tube onto the cable using the installation tool.

Referring to FIG. 3, one example of a process to dispose the shrink tube 208 onto the cable 250 using the installation tool 200 is a process 300. In one example, the cable 250 is first inspected end-to-end for damage prior to repair. The location and length of damage is recorded. The initial inspection of the cable determines the length of shrink tube tubing required to repair each respective damage site. The shrink tube 208 is loaded in the installation tool 200 (304) via the open end of the tool in pre-cut segments with length and respective serial order defined by the initial inspection. In another example, the installation tool 200 disposes shrink tube segments cut to length by an integrated cutter (not shown). The integrated cutter allows cable inspection and repair to be concurrent activities. As cable damage is encountered an appropriate length of tubing is cut to order. The installation tool 200 with the integrated cutter is loaded with a continuous length of shrink tube 208. The length of continuous tubing corresponds to the axial capacity of the installation tool 200 (e.g., an installation tool 200 with 36-inch pipes can accommodate a 36-inch segment of tubing). The cable 250 is fed through the installation tool 200 stopping just after a damage site passes out the tail end of the tool. The shrink tube segments are accessed via the longitudinal perforation in the outer pipe 202 and slid out the open end of installation tool 200 onto the damaged cable jacket area (308).

Referring to FIGS. 4A to 4D, an example of a tool to taper the shrink tube 208 after the shrink tube has been heated, for example, is a taper tool 400. The taper tool 400 includes a first member 402, a second member 404 and hinges 406 coupling the first member to the second member. The first member 402 and the second member 404 each include a channel 422. The taper tool also includes a razor blade 408. For simplicity, the razor blade 408 is in an exploded view from the rest of the taper tool 400 as will be further described. The channel 422 includes a first section 422a, a second section 422b and a third section 422c. The first section has a width, $W_1$, and the third section 422c has a width, $W_2$, which is smaller than the width, $W_1$. In one example, $W_1$ is 0.62 inches and $W_2$ is 0.28 inches and the cable 250 is a 0.25-inch-diameter cable. The second section 422b is between the first section 422a and the third section 422c and thus the length of the second section tapers from the width, $W_1$ to the width, $W_2$. One of ordinary skill in the art would recognize that the tool dimensions can be altered to accommodate cables of other diameters. The first section 422a and the second section 422b are configured to receive the cable 250 with the shrink tube 208 with the second section receiving an end portion 428 of the shrink tube 208. The third section 422c is configured to receive the cable 250 without the shrink tube 208. The second member 402 includes a slot aperture 430 for holding the razor blade 408 and angled in order to taper the end portion 428 of the shrink tube 208. The first member 402 includes a gap 440 from which shrink tube parings/shavings are expelled.

Figure 4A:
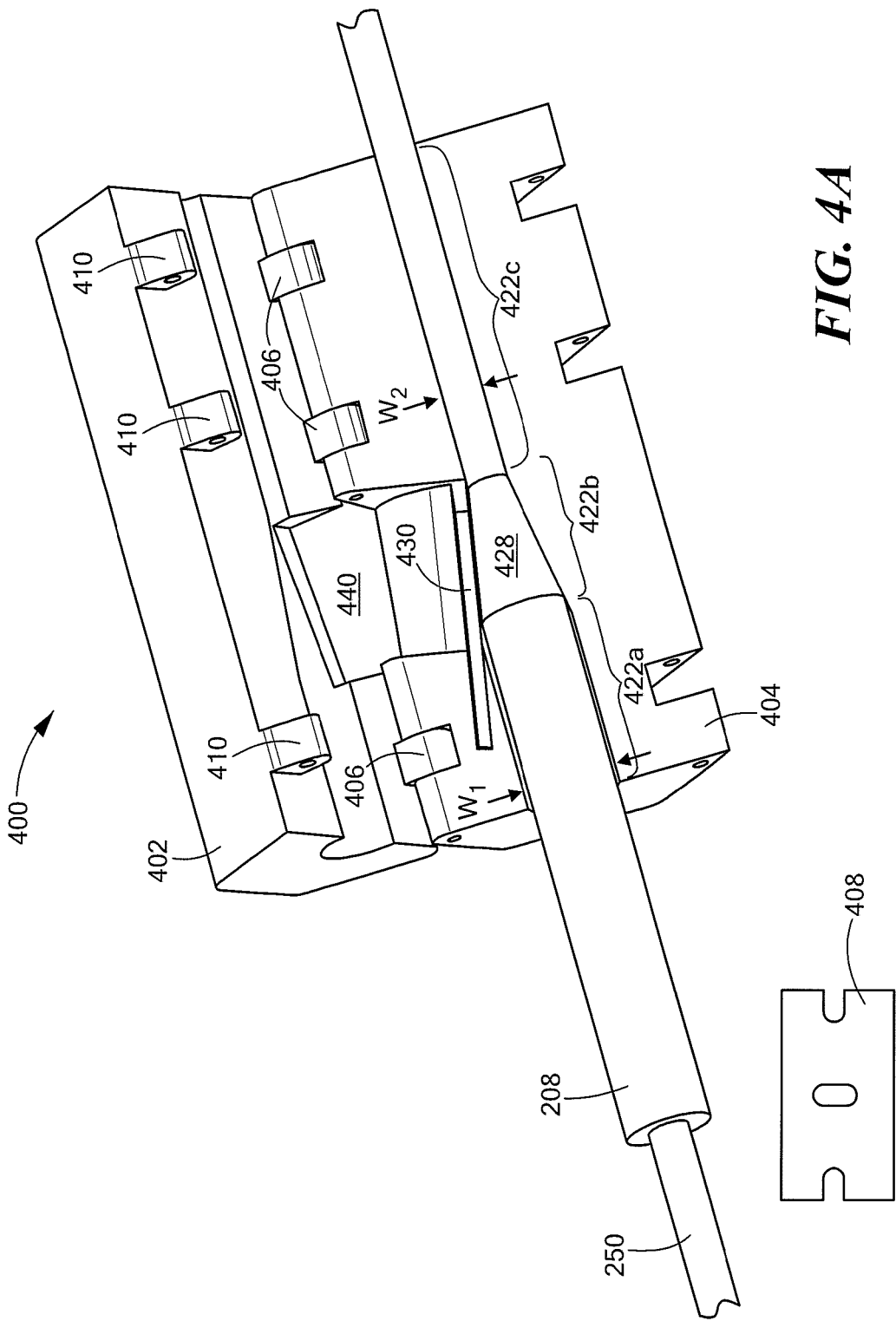
FIGS. 4A to 4D are views of a tapering tool with the cable and a shrunken shrink tube.
Figure 4B:
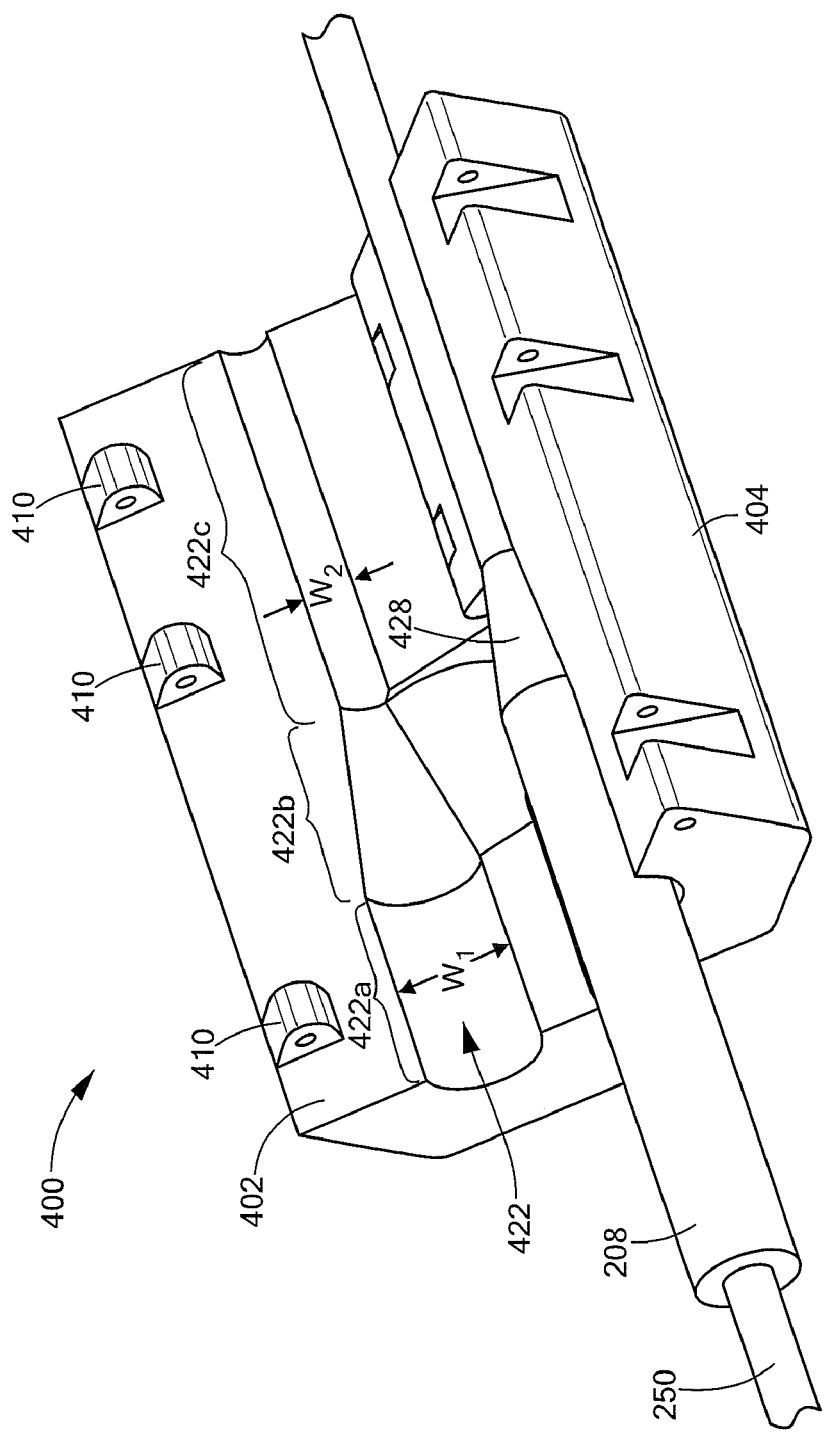
Figure 4C:
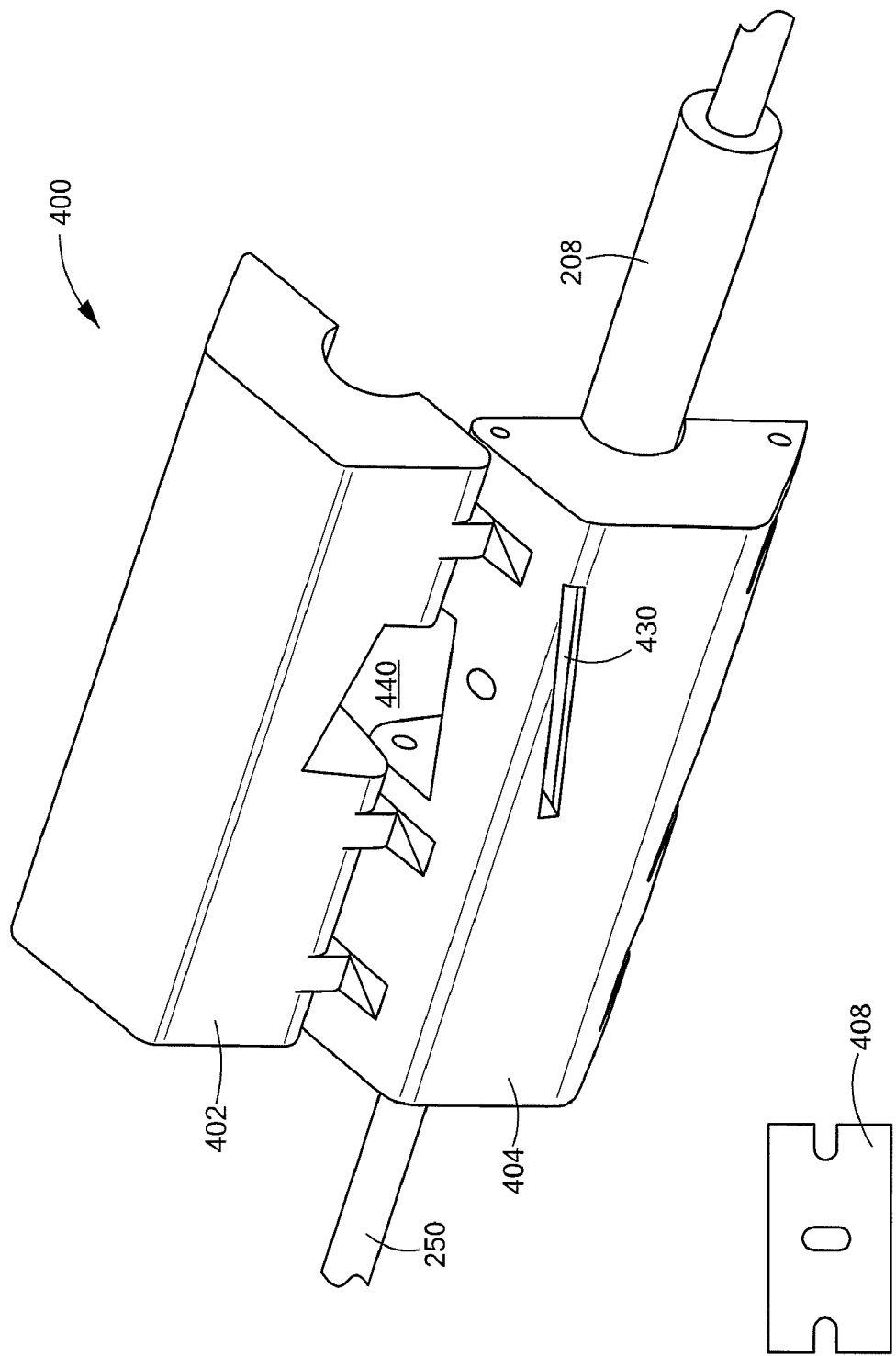
Figure 4D:
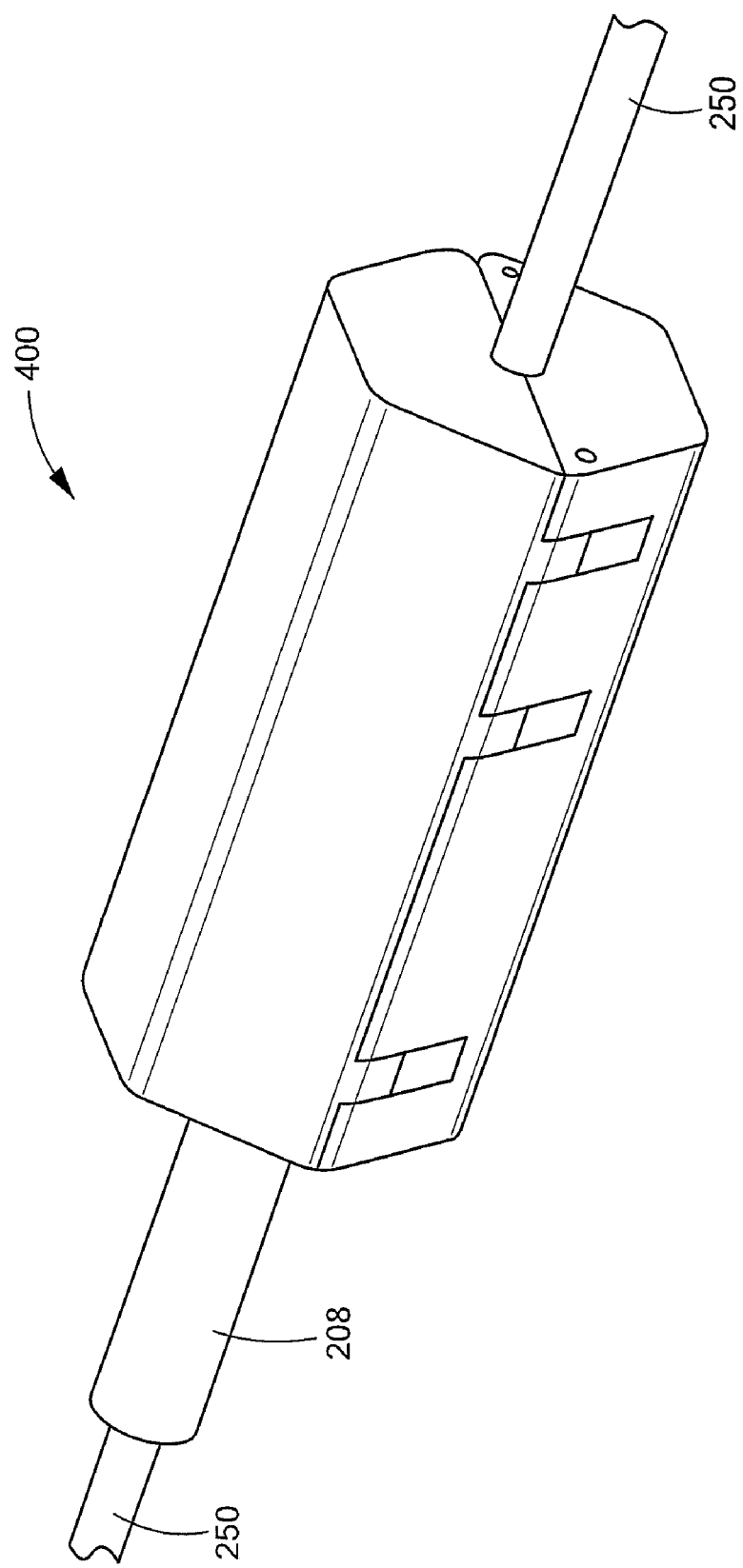
Figure 5:
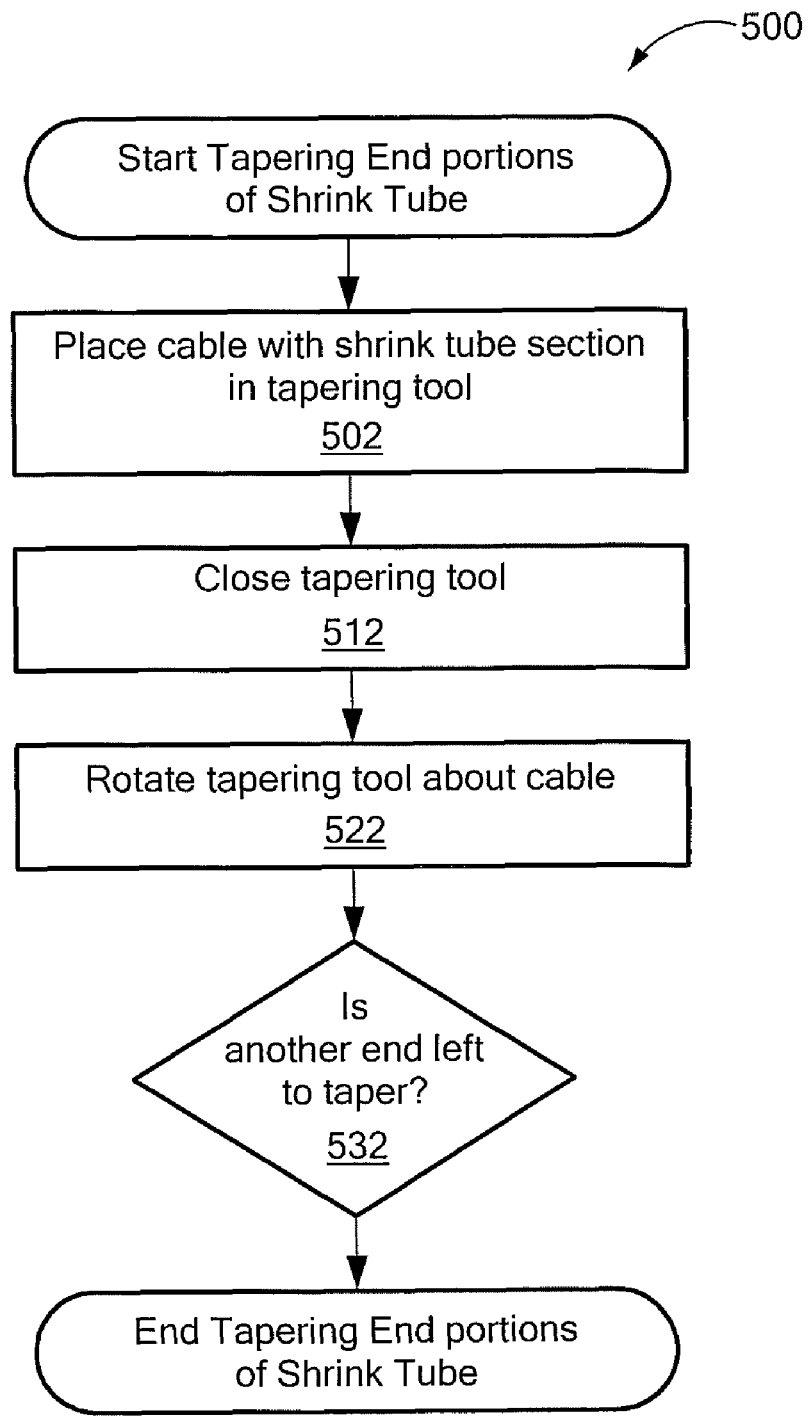
FIG. 5 is a flowchart of an example of a process to taper a shrink tube.

Referring to FIG. 5, one example of a process to taper end portions of a shrink tube using the tapering tool 400 is a process 500. The cable 250 with the shrink tube 208 is placed in the tapering tool 400 (502). For example, the cable 250 with the shrink tube 208 is placed in one of the channels 422 as shown in FIGS. 4A to 4C. In particular, a portion of the cable 250 with the shrink tube 208 is placed in the first section 422a and the second section 422b with the second section receiving the end portion 428 of the shrink tube. A portion of the cable 250 without the shrink tube 208 is placed in the third section 422c. The tapering tool 400 is closed (512). For example, the first member 402 and the second member 404 are place on top of each other as shown in FIG. 4D so that the channels 422 are aligned. The tapering tool 400 is rotated about the cable (522). In particular, the end portion 428 of the shrink tube 208 is in contact with a razor blade 408 in the slot aperture 430. As the taper tool is rotated about the cable 250, the razor blade 408 correspondingly rotates and slices away the shrink tube 208 to form a taper. In one example, the razor blade is a standard razor blades commonly used. It is determined if another end of the shrink tube 208 is left to taper (532). If so, processing blocks 502, 512, 522 and 532 are repeated.

The processes described herein are not limited to the specific embodiments described. For example, the processes 100, 300 and 500 are not limited to the specific processing order of FIGS. 1, 3 and 5, respectively. Rather, any of the processing blocks of FIGS. 1, 3 and 5 may be re-ordered, combined or removed, performed in parallel or in serial, as necessary, to achieve the results set forth above.

Elements of different embodiments described herein may be combined to form other embodiments not specifically set forth above. Other embodiments not specifically described herein are also within the scope of the following claims.

What is claimed is:

1. A device to taper end portions to cable jacket shrink tube, comprising:
   a first member comprising:
      a first channel having a first width perpendicular to the longitudinal axis and extending along a longitudinal axis of the device;
      a second channel extending along the longitudinal axis of the device and having a second width smaller than the first width and perpendicular to the longitudinal axis;
   a second member comprising:
      a third channel extending along a longitudinal axis of the device and having a width perpendicular to the longitudinal axis and substantially equal to the first width and;

a fourth channel extending along the longitudinal axis of the device and having a width perpendicular to the longitudinal axis and substantially equal to the second width; and a fastening structure configured to fasten the first member and the second member together and to enable the device to be in an open position and a closed position, wherein, in the closed position, the first and third channels form a single channel configured to hold a first portion of a cable having a shrink tube and the second and fourth channels form a single channel configured to hold a second portion of the cable without the shrink tube, between the first channel and the second channel the device is configured to hold a tapered shrink tube.

2. The device of claim 1, wherein the first member forms a recess configured to hold a cutting device configured to taper an end portion of the shrink tube from a first width to a second width.

3. The device of claim 2 wherein the cutting device is a razor.

4. The device of claim 1 wherein the fastener structure comprises a hinge.

5. A device to dispose a shrink tube on a cable, comprising:
an outer pipe;
an inner pipe disposed within the outer pipe; and
an end cap configured to hold the outer pipe and the inner pipe together,
wherein the device is configured to receive the tube between the outer pipe and the inner pipe and to receive the cable through an interior of the inner pipe.

6. The device of claim 5, further comprising a cutter configured to cut the tube.

7. The device of claim 5 where the tube is the shrink tube configured to shrink eight times when heated to a temperature of about 220° C.

8. The device of claim 5 wherein the outer pipe also comprises perforations.

* * * * *